(12) United States Patent
Liao

(10) Patent No.: US 7,900,030 B2
(45) Date of Patent: Mar. 1, 2011

(54) METHOD FOR DETERMINING A REBOOTING ACTION OF A COMPUTER SYSTEM AND RELATED COMPUTER SYSTEM

(75) Inventor: Wei-Cheng Liao, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 581 days.

(21) Appl. No.: 12/039,740

(22) Filed: Feb. 29, 2008

(65) Prior Publication Data
US 2008/0270783 A1 Oct. 30, 2008

(30) Foreign Application Priority Data
Apr. 30, 2007 (TW) ................. 96115288 A

(51) Int. Cl.
*G06F 9/00* (2006.01)
*G06F 9/24* (2006.01)
*G06F 15/177* (2006.01)
(52) U.S. Cl. .................. 713/1; 713/2; 713/300; 713/320
(58) Field of Classification Search .................. 713/1, 2, 713/300, 320
See application file for complete search history.

(56) References Cited

U.S. PATENT DOCUMENTS

| 5,237,698 | A  | * | 8/1993 | Ohmae ........................... 714/23 |
| 7,549,009 | B2 | * | 6/2009 | Ho et al. ....................... 710/313 |
| 2002/0120843 | A1 | * | 8/2002 | Goodman et al. ............ 713/164 |
| 2007/0156934 | A1 | * | 7/2007 | Ho et al. ...................... 710/105 |

* cited by examiner

*Primary Examiner* — Thomas Lee
*Assistant Examiner* — Jaweed A Abbaszadeh
(74) *Attorney, Agent, or Firm* — Winston Hsu; Scott Margo

(57) ABSTRACT

A method for determining a rebooting action of a computer system includes: a keyboard controller of the computer system detecting whether a signal representing a system stage transformation is transmitted from a south bridge chipset; determining whether a system status flag is set as "ON" when the signal representing the system stage transformation is received by the keyboard controller; setting a rebooting flag as "ON" and setting the system status flag as "OFF"; determining whether a system sleeping flag representing the computer system isn't activated is "ON" and determining whether the rebooting flag is set as "OFF" according to this determined result; detecting whether the signal representing the system stage transformation is transmitted from the south bridge chipset; determining whether the rebooting flag is set as "ON"; and determining whether the computer system executes the rebooting action according to a determined result of whether the rebooting flag is "ON".

19 Claims, 5 Drawing Sheets

METHOD FOR DETERMINING A REBOOTING ACTION OF A COMPUTER SYSTEM AND RELATED COMPUTER SYSTEM

BACKGROUND OF THE INVENTION

1. Field of the Invention

The present invention relates to a method for determining a rebooting action of a computer system and a related computer system, and more particularly, to a method for determining a rebooting action of a computer system with a keyboard controller and a related computer system.

2. Description of the Prior Art

In the modern information society nowadays, a computer system has been one of the essential information tools, no matter a desktop personal computer, a notebook, or a server. The operating clock rate of the computer system is getting faster and faster, and the application level prevails more widely and broadly.

According to the conventional specification made by the Advanced Configuration and Power Interface (ACPI), the computer system is sorted into S0, S1, S2, S3, S4, and S5 statuses on a basis of power consumption of the computer system. The S0, S1, S2 statuses are all active statuses but differ from on/off conditions between the operating clock rate of the processor and each component respectively; the S3 status is a standby status, that means the computer system will keep all the information stored in the memory (suspend to RAM, STR); the S4 status is a sleeping status, that means the computer system has to end all the programs in executing and TSR (Terminate and Stay Resident) programs, and stores the system configuration in a hard disk temporarily (suspend to disk, STD); the S5 status is a shutting-down status, that means the computer system will execute a shutting-down procedure.

From a viewpoint of the system, when the computer powers on, a PCIRST signal transmitted from a basic input/output system (BIOS) shifts from a low level to a high level. During the period of power-on self testing (POST), the basic input/output system commands to set a system status flag of a keyboard controller as "ON" (for example "1") through an I/O port 64*h*. At this time the system status flag represents the computer system is in the active status. However when the computer system prepares to enter a standby status, a sleeping status, or a shutting-down status, the PCIRST signal will shift from the high level to the low level. At this time the system status flag of the keyboard controller will be set as "OFF" (cleared to 0). When the computer system reboots, the basic input/output system reads the system status flag of the keyboard controller through the I/O port 64*h*. If the system status flag is 1, the basic input/output system determines that the computer system is in the rebooting status and pushes the PCIRST signal to produce a low pulse in order to inform all the components connected to PCI buses of executing a reset action.

From a viewpoint of the keyboard controller, the keyboard controller can detect an S3 signal (SLP_S3#), an S4 signal (SLP_S4#), or an S5 signal (SLP_S5#) transmitted form the south bridge chipset to determine whether the computer system is in the standby status, the sleeping status, or the shutting-down status. When the S3, S4, S5 signals are all in the high level, it represents the computer system is in the active status. But only seeing through the S3, S4, S5 signals transmitted from the south bridge chipset can't determine whether the computer system is in the rebooting status. This is because when the computer system is in the rebooting status, the S3, S4, S5 signals are still in the high level and unchanged. During the rebooting process of the computer system, the system status flag keeps unchanged until the PCIRST signal shifts from the high level to the low level. Then the system status flag of the keyboard controller will be cleared to 0. This action is the same as the action executed when the computer system is going to enter the standby status, the sleeping status, or the shutting-down status. Therefore these information isn't enough for the keyboard controller to determine whether the computer system should execute the rebooting action. Furthermore many other actions corresponding to the rebooting action can't be executed efficiently, and the rebooting time is too long to lower the system efficiency.

SUMMARY OF THE INVENTION

It is therefore a primary objective of the claimed invention to provide a method for determining a rebooting action of a computer system with a keyboard controller and a related computer system for solving the above-mentioned problem.

The claimed invention provides a method for determining a rebooting action of a computer system comprising a keyboard controller of the computer system detecting whether a signal representing a system stage transformation is transmitted from a south bridge chipset; the keyboard controller determining whether a system status flag is set as "ON" when the signal representing the system stage transformation is received by the keyboard controller; setting a rebooting flag as "ON" and setting the system status flag as "OFF" when the keyboard controller determines the system status flag is "ON"; the keyboard controller detecting whether a system sleeping flag representing the computer system isn't activated is "ON"; the keyboard controller determining if the rebooting flag is set as "OFF" according to a determined result of whether the system sleeping flag representing the computer system isn't activated is "ON"; the keyboard controller detecting whether the signal representing the system stage transformation is transmitted from the south bridge chipset; the keyboard controller determining whether the rebooting flag is set as "OFF" when the signal representing the system stage transformation is received by the keyboard controller; and determining whether the computer system executes the rebooting action according to a determined result of the keyboard controller determining whether the rebooting flag is "ON".

These and other objectives of the present invention will no doubt become obvious to those of ordinary skill in the art after reading the following detailed description of the preferred embodiment that is illustrated in the various figures and drawings.

DETAILED DESCRIPTION

Figure 1:
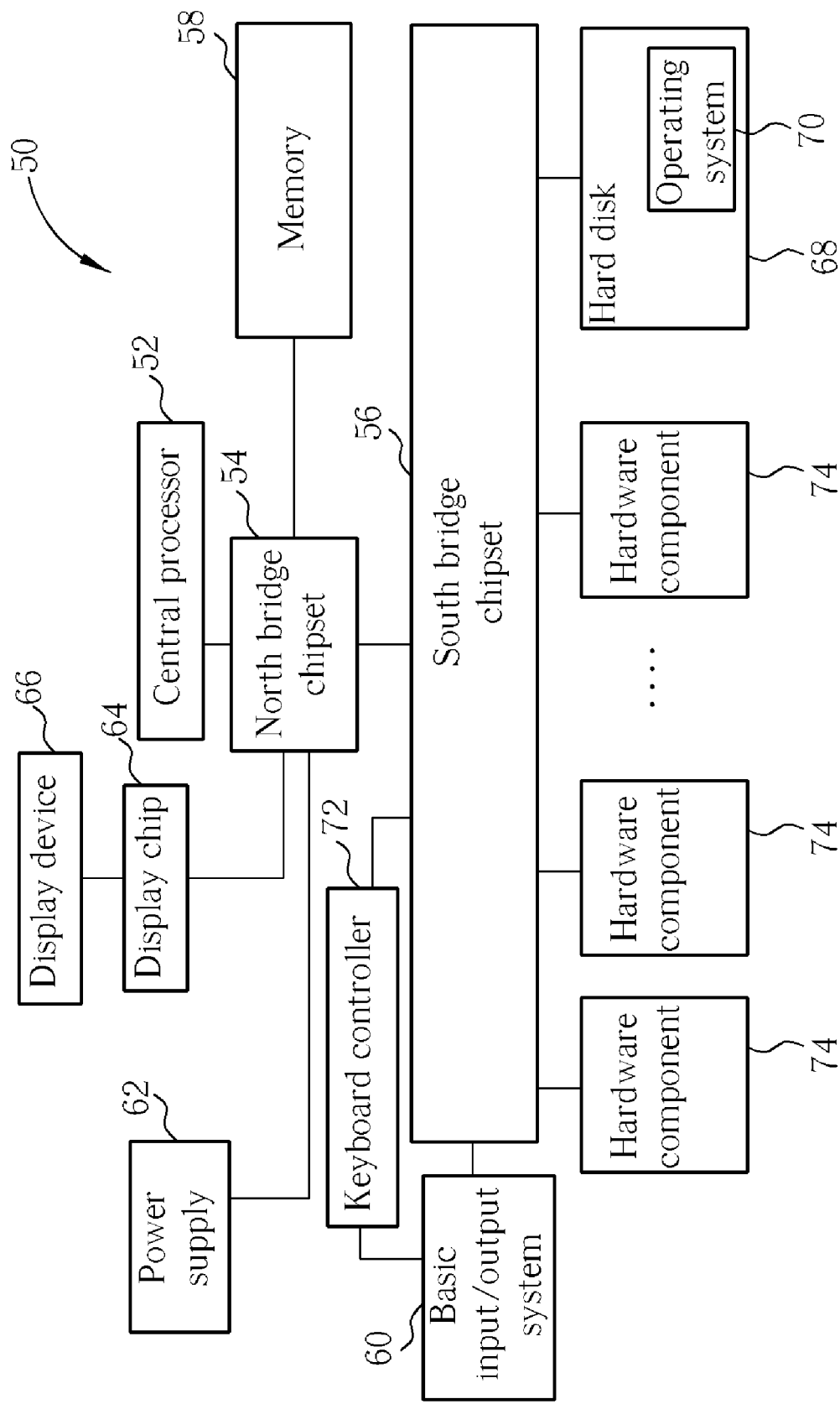
FIG. 1 is a functional block diagram of a computer system according to a preferred embodiment of the present invention.

Please refer to FIG. 1. FIG. 1 is a functional block diagram of a computer system 50 according to a preferred embodiment of the present invention. The computer system 50 can be a notebook. The computer system 50 includes a central processor 52, a north bridge chipset 54, a south bridge chipset 56, a memory 58, a basic input/output system 60, a power supply 62, a display chip 64, a display device 66, a hard disk 68 for storing an operating system 70, a keyboard controller 72, and several hardware components 74. In this computer system 50, the north bridge chipset 54 is electrically connected to the central processor 52; the south bridge chipset 56, the memory 58, the power supply 62, and the display chip 64 are electrically connected to the north bridge chipset 54. The display device 66 can be an LCD electrically connected to the display chip 64; the basic input/output system 60, the hard disk 68, the keyboard controller 72, and the several hardware components 74 are electrically connected to the south bridge chipset 56.

The central processor 52 controls the operation of the computer system 50. The north bridge chipset 54 controls data transmission between the central processor 52, the memory 58, and the display chip 64. The display chip 64 is capable of transforming data of an image into image signals and then displaying the image on the display device 66. The south bridge chipset 56 controls data transmission between the basic input/output system 60 and the central processor 52, and data transmission between the several hardware components 74, the hard disk 68, and the central processor 52. The several hardware components 74 can be storage devices (such as a floppy disk drive, a hard disk, a compact disk drive, and a CD/DVD recorder), input devices (such as a keyboard, a mouse), a printer, audio equipment, an Internet equipment etc. Basically among peripheral devices electrically connected to the computer system 50, except signals of connecting the display chip 64 is dealt by the north bridge chipset 54, all the other peripheral input/output devices are almost managed by the south bridge chipset 56. But as to the communication between the south bridge chipset 56 and the central processor 52, it has to pass through the north bridge chipset 54 electrically connected to the central processor 52. The basic input/output system 60 stored in a non-volatile memory is for executing the power-on self test (POST) of the computer system 50, and for loading in the operating system 70 after finishing the test. The memory 58 can be a random access memory, such as a double data rate memory (DDR memory), for storing data temporarily. The power supply 62 electrically connected a destined voltage (such as 110V) can convert the destined voltage into several different operating voltages for the operation of the computer system 50 (such as the different operating voltages needed for the hard disk, the memory, and the central processor). Furthermore in different system statuses (such as an active status, a standby status, a sleeping status, or a shutting-down status), the power supply 62 will supply different voltages correspondingly. When the computer system 50 shuts down, the keyboard controller 72 will still keep the supply of electric power and wait for booting information from a user. After detecting a touch on a booting key from the user, the keyboard controller 72 will inform the whole system 50 of switching to power on. After the computer system 50 is powered on, the keyboard controller 72 will monitor the standby status, the sleeping status, or the shutting-down status of the computer system 50 and control the peripheral components according to the status of the computer system 50 correspondingly.

Figure 2:
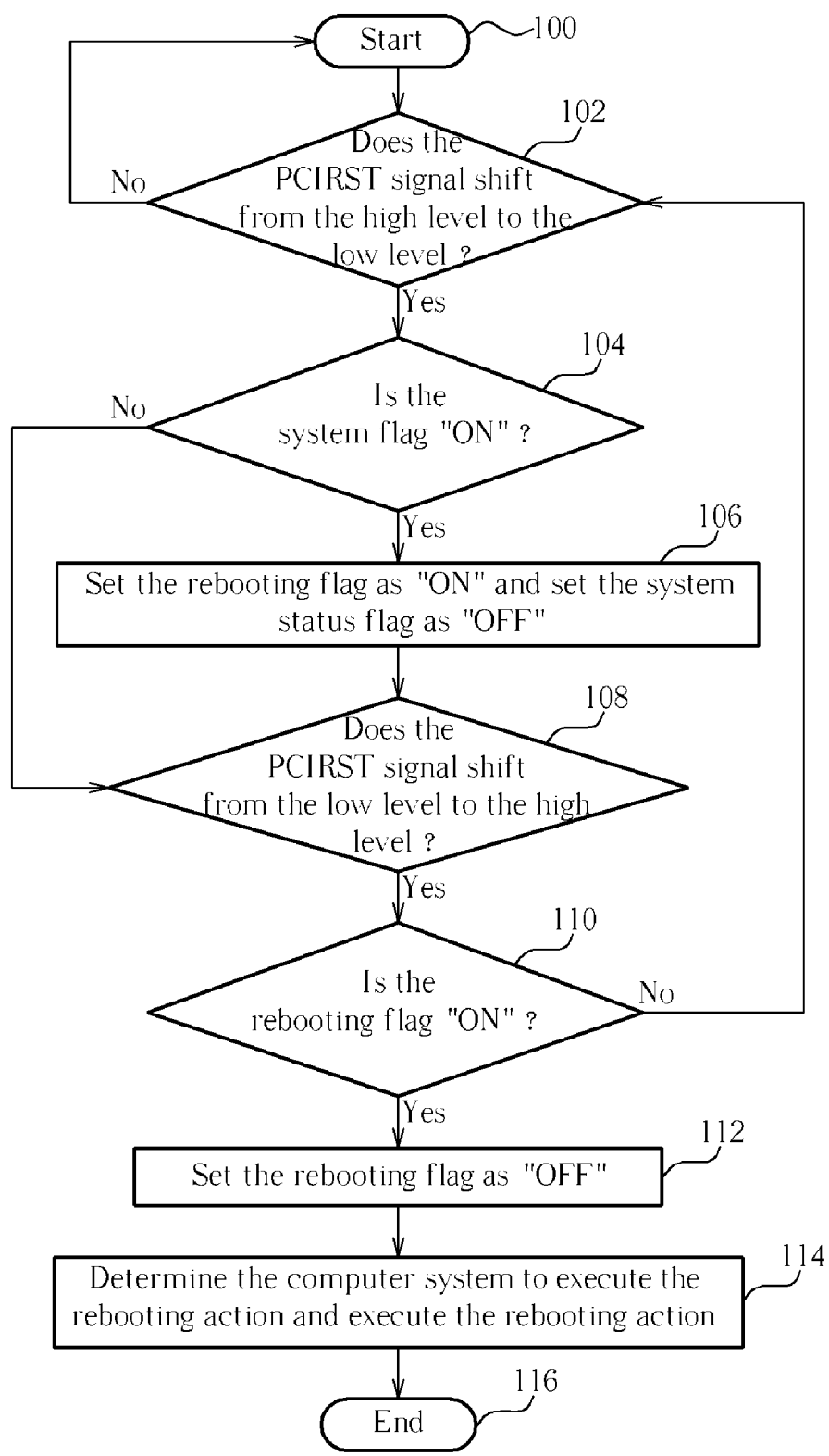
FIG. 2 and FIG. 3 are flowcharts of determining whether the computer system executes a rebooting action according to a first embodiment of the present invention.
Figure 3:
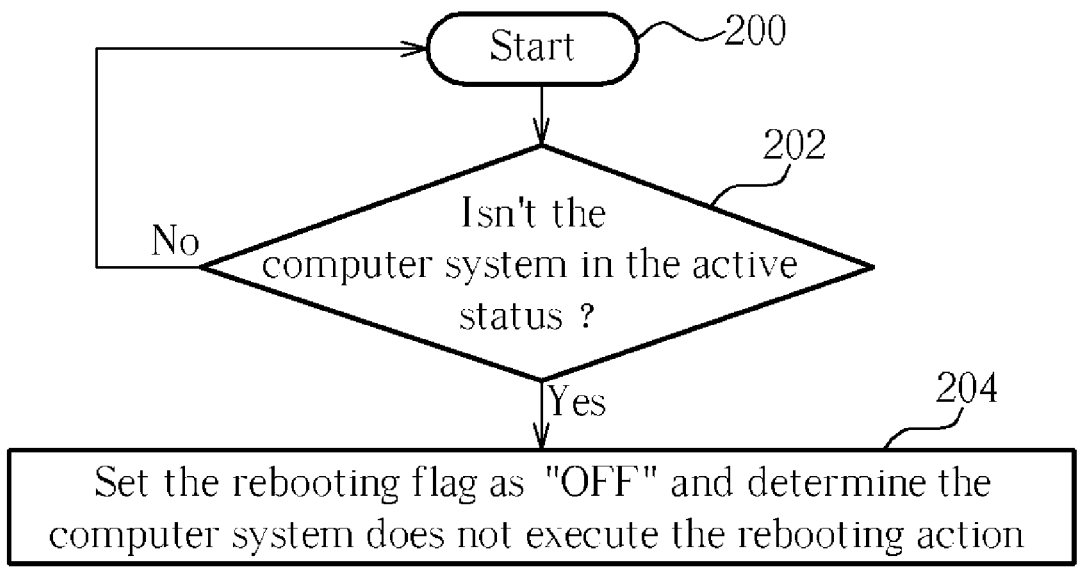

Please refer to FIG. 2 and FIG. 3. FIG. 2 and FIG. 3 are flowcharts of determining whether the computer system 50 should execute a booting action according to a first embodiment of the present invention. The sequences of the steps in FIG. 2 and in FIG. 3 are synchronous. FIG. 2 includes following steps:

Step 100: start.

Step 102: the keyboard controller 72 detects whether a PCIRST signal transmitted from the basic input/output system 60 shifts from the high level to the low level. If yes, execute the step 104; if no, return to the step 100.

Step 104: the keyboard controller 72 determines whether the system status flag is "ON". If yes, execute the step 106, if no, execute the step 108.

Step 106: set a rebooting flag as "ON" and set the system status flag as "OFF".

Step 108: the keyboard controller 72 determines whether a PCIRST signal shifts from the low level to the high level. If yes, execute the step 110.

Step 110: the keyboard controller determines whether the rebooting flag is "ON". If yes, execute the step 112; if no, return to the step 102.

Step 112: set the rebooting flag as "OFF".

Step 114: determine whether the computer system 50 should execute the rebooting action, and the computer system 50 executes the rebooting action.

Step 116: end.

FIG. 3 includes the following steps:

Step 200: start.

Step 202: the keyboard controller 72 determines whether the computer system 50 isn't in the active status, such as in the standby status (S3), the sleeping status (S4), or the shutting-down status (S5). If yes, execute the step 204; if no, return to the step 200.

Step 204: set the rebooting flag as "OFF" and determine the computer system 50 does not execute the rebooting action.

Detailed description of the above procedures is introduced as follows. When the computer powers on, the PCIRST signal representing a system stage transformation transmitted from the south bridge chipset 56 will shift from the low level to the high level. During the power-on self-test period, the basic input/output system 60 commands to set the system status flag of the keyboard controller 72 as "ON" (such as "1") through the I/O port 64h. At this time the system status flag represents the computer system 50 is in the active status. When the computer system 50 prepares to enter the standby status, the sleeping status, or the shutting-down status, the PCIRST signal will shift from the high level to the low level. At this time the system status flag of the keyboard controller 72 will be set as "OFF" (cleared to 0). First of all, the keyboard controller 72 can detect whether the PCIRST signal representing the system stage transformation transmitted from the south bridge chipset 56 shifts from the high level to the low level by polling or interrupting. If the PCIRST signal shifts from the high level to the low level, it represents the status of the computer system 50 is going to change into the standby status, the sleeping status, or the shutting-down status, or a rebooting status etc. The following step makes further judgments. The keyboard controller 72 has to determine whether the system status flag is "ON". If the system status flag is not "ON", it represents the computer system 50 isn't in the active status that means the computer system 50 has entered the standby status, the sleeping status, or the shutting-down status. At this time the computer system 50 can't execute the rebooting action directly, and the computer system 50 has to go back to the active status. Only when the PCIRST signal shifts from the low level to the high level, the computer system 50 can execute the rebooting action. Therefore the next step will go to the step 108. If the keyboard controller 72 determines the system status flag is "ON", it represents the computer system 50 is in the active status. At this time the rebooting flag is set as "ON" (such as "1") as a flag for determining whether the computer system 50 executes the rebooting action and the system status flag is set as "OFF" simultaneously. Then the keyboard controller 72 is reset to detect whether the PCIRST signal transmitted from the south bridge chipset 56 shifts from the low level to the high level.

Figure 4:
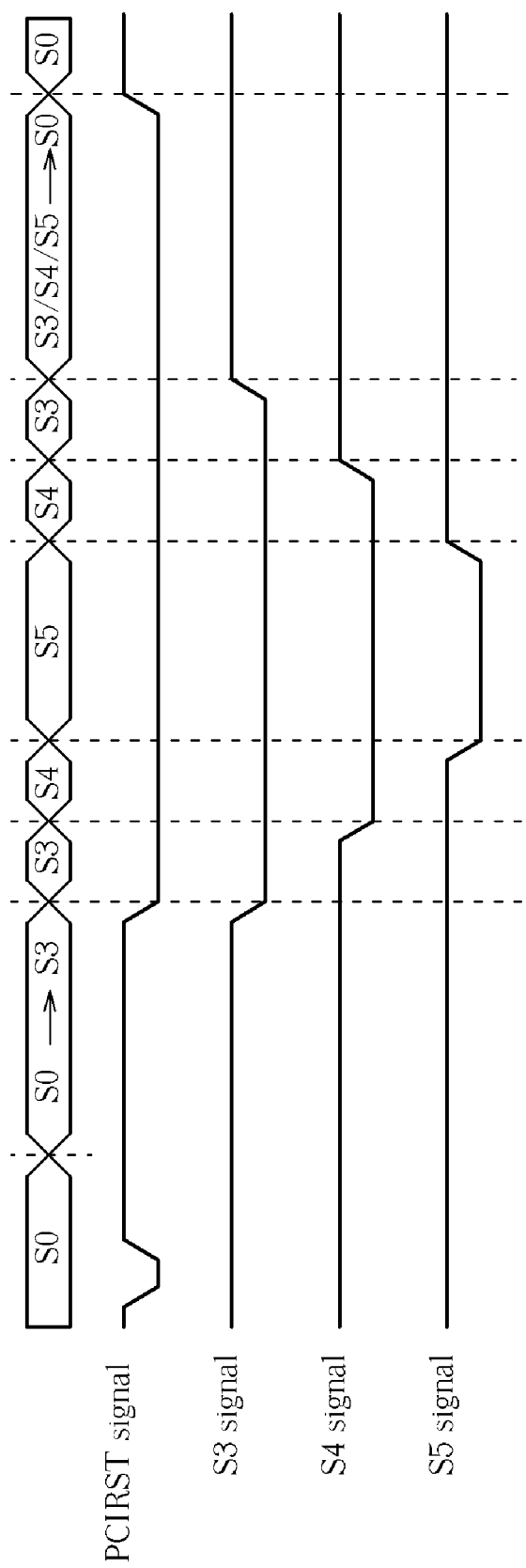
FIG. 4 is clock diagrams of S3, S4, S5 signals in S0 to S5 statuses and the PCIRST signal.

Executing the above steps simultaneously, the keyboard controller 72 keeps determining whether the computer system 50 isn't in the active status, such as in the standby status, the sleeping status, or the shutting-down status. The keyboard controller 72 can detect an S3 signal (SLP_S3#), an S4 signal (SLP_S4#), or an S5 signal (SLP_S5#) transmitted from the south bridge chipset 56 in order to determine whether the system status of the computer system 50 is in the standby status, the sleeping status, or the shutting-down status. Please refer to FIG. 4. FIG. 4 is a clock diagram of S3, S4, S5 signals in S0 to S5 statuses and the PCIRST signal of the present invention. When the PCIRST signal shifts from the high level to the low level and then rapidly shifts from the low level to the high level again, it represents the computer system 50 is in the rebooting status; when the system status of the computer system 50 changes from the active status to the standby status (S3), the sleeping status (S4), or the shutting-down status (S5), the PCIRST signal will shift from the high level to the low level; when the system status of the computer system 50 changes from the standby status, the sleeping status, or the shutting-down status to the active status, the PCIRST signal will shift from low level to the high level. And moreover, when the system status of the computer system 50 changes from the active status to the standby status (S3), the S3 signal will shift from the high level to the low level, and vice versa. When the system status of the computer system 50 changes from the standby status (S3) to the active status, the S3 signal will shift from the low level to the high level. When the system status of the computer system 50 changes from the standby status (S3) to the sleeping status (S4), the S4 signal will shift from the high level to the low level, and vice versa. When the system status of the computer system 50 changes from the sleeping status (S4) to the standby status (S3), the S4 signal will shift from the low level to the high level. When the system status of the computer system 50 changes from the sleeping status (S4) to the shutting-down status (S5), the S5 signal will shift from the high level to the low level, and vice versa. And when the system status of the computer system 50 changes from the shutting-down status (S5) to the sleeping status (S4), the S4 signal will shift from the low level to the high level. In conclusion, when the S3, S4, S5 signals are all in the high level, it represents the computer system 50 is in the active status; when the S3 signal is in the low level but the S4, S5 signals are in the high level, it represents the computer system 50 is in the standby status; when the S3, S4 signals are in the low level but the S5 signal is in the high level, it represents the computer system 50 is in the sleeping status; and when the S3, S4, S5 signals are all in the low level, it represents the computer system 50 is in the shutting-down status. Therefore, when the keyboard controller 72 detects one of the S3, S4, and S5 signals is in the low level, it represents the system status of the computer system 50 has changed into one of the standby status, the sleeping status, or the shutting-down status. At this time the rebooting flag is set as "OFF" and the computer system 50 is determined not to execute the rebooting action.

When the keyboard controller 72 detects the PCIRST signal transmitted from the south bridge chipset 56 shifts from the low level to the high level, the keyboard controller 72 determines whether the rebooting flag is "ON". If not, it is because the keyboard controller 72 determines the system status of the computer system 50 is in the standby status, the sleeping status, or the shutting-down status in the step 204 so as to set the rebooting flag as "OFF". At this time return to the step 102 and re-execute the above procedures. If yes, it means during the period of the PCIRST signal shifting, the computer system 50 keeps in the active status so as to determine the system status of the computer system 50 is the rebooting status and the computer system 50 executes the rebooting action correspondingly. For example, programs can be reset to the initial conditions or the variables of the programs are cleared to zero, setting the brightness and the control method of the display device 66 to the initial status, controlling the peripheral hardware components 74 in a disable status, afterwards choosing the operating system 74 (Windows, DOS, Linux etc.) stored in the hard disk 68 preferred by the user himself, and initializing the variables of the programs again. The above procedures can be executed repeatedly, that means after the computer system 50 executes the rebooting action, continue the procedures of determining the rebooting action for the next time.

Figure 5:
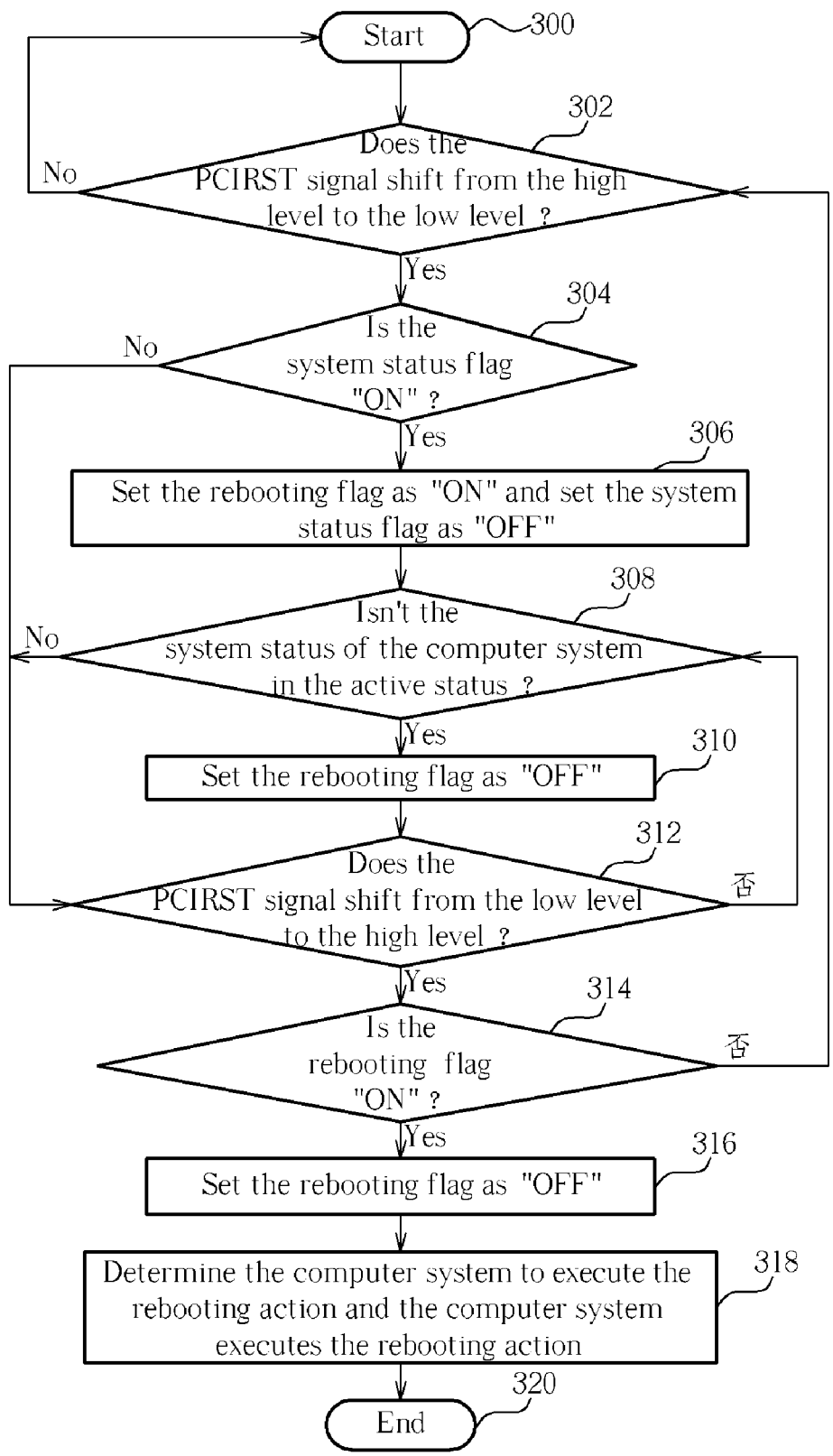
FIG. 5 is a flowchart of determining whether the computer system executes the rebooting action according to a second embodiment of the present invention.

Please refer to FIG. 5. FIG. 5 is the flowchart of determining whether the computer system 50 executes the rebooting action according to the second embodiment of the present invention and includes following steps:

Step 300: start.

Step 302: the keyboard controller 72 detects whether the PCIRST signal transmitted from the south bridge chipset 56 shifts from the high level to the low level. If yes, execute the step 304; if not, go back to the step 300.

Step 304: the keyboard controller 72 determines whether the system status flag is "ON". If yes, execute the step 306, if no, execute the step 312.

Step 306: set the rebooting flag as "ON" and set the system status flag as "OFF".

Step 308: the keyboard controller 72 determines whether the system status of the computer system 50 isn't in the active status, for example in the standby status, the sleeping status, or the shutting-down status. If yes, execute the step 310, if no, execute the step 312.

Step 310: set the rebooting flag as "OFF".

Step 312: the keyboard controller 72 determines whether the PCIRST signal shifts from the low level to the high level. If yes, execute the step 314; if no, return to the step 308.

Step 314: the keyboard controller 72 determines whether the rebooting flag is "ON". If yes, execute the step 316; if no, return to the step 302.

Step 316: set the rebooting flag as "OFF".

Step 318: determine the computer system 50 to execute the rebooting action and the computer system 50 executes the rebooting action.

Step 320: end.

The detailed description of the above procedure is introduced as follows. When the computer powers on, the PCIRST signal transmitted from the south bridge chipset 56 will shift from the low level to the high level, and in the period of power-on self testing (POST), the basic input/output system 60 will set the system status flag of the keyboard controller 72 as "ON" (for example "1") through the I/o port 64h. At this time the system status flag represents the computer system 50 is in the active status. When the computer system 50 is going to enter the standby status, the sleeping status, or the shutting-down status, the PCIRST signal will shift from the high level to the low level. At this time the system status flag of the keyboard controller 72 will be set as "OFF" (cleared to 0). First of all, the keyboard controller 72 can detect whether the PCIRST signal transmitted from the south bridge chipset 56 shifts from the high level to the low level by polling or interrupting. If the PCIRST signal shifts from the high level to the low level, it represents the system status of the computer system 50 is going to change into the standby status, the sleeping status, the shutting-down status, or the rebooting status. The following step makes further judgments. The keyboard controller 72 has to determine whether the system status flag is "ON". If the system status flag is not "ON", it represents the system status of the computer system 50 isn't in the active status, that means the computer system 50 has entered the standby status, the sleeping status, or the shutting-down status. At this time the computer system 50 isn't able to execute the rebooting action directly, and the computer system 50 has to go back to the active status first. The PCIRST signal has to shift from the low level to the high level, afterwards the computer system 50 can execute the booting action. Then go to the step 312. If the keyboard controller 72 determines the system status flag is "ON", it represents the computer system 50 is in the active status. At this time the rebooting flag is set as "ON" (for example "1") as a flag for determining whether the computer system 50 should execute the rebooting action. At the same time the system status flag is set as "OFF". The difference between the first embodiment and the second embodiment is that the sequence of the steps in FIG. 2 and in FIG. 3 are executed synchronously in the first embodiment, that means the sequence of the steps in FIG. 2 and the sequence of the steps in FIG. 3 are independent and can be executed parallel and separately; but in the second embodiment, the steps in FIG. 2 and FIG. 3 of the first embodiment are integrated together, that means the step 202 and the step 204 are executed after the step 106. After executing the step 306, the keyboard controller 72 will determine whether the system status of the computer system 50 isn't in the active status, such as in the standby status, the sleeping status, or the shutting-down status. The keyboard controller 72 can detect the S3, S4, or S5 signals transmitted from the south circuit 56 of the computer system 50 by polling in order to determine whether the computer system 50 is in the standby status, the sleeping status, or the shutting-down status. When the S3, S4, S5 signals are all in the high level, it represents the computer system 50 is in the active status; when the S3 signal is in the low level but the S4, S5 signals are in the high level, it represents the computer system 50 is in the standby status. When the S3, S4 signals are in the low level but the S5 signal is in the high level, it represents the computer system 50 is in the sleeping status; when the S3, S4, S5 signals are all in the low level, it represents the computer system 50 is in the shutting-down status. Therefore, when the keyboard controller 72 detects one of the S3, S4, and S5 signals is in the low level, it represents the system status of the computer system 50 has changed into the standby status, the sleeping status, or the shutting-down status. At this time, set the rebooting flag as "OFF" and continue executing the step 312. When the keyboard controller 72 detects all the S3, S4, and S5 signals are in the high level, it represents the system status of the computer system 50 is in the active status. At this time, the rebooting flag is not "OFF" and the step 312 continues being executed.

When the keyboard controller 72 detects the PCIRST signal transmitted from the south bridge chipset 56 doesn't shift from the low level to the high level, the keyboard controller 72 will continue determining whether the system status of the computer system 50 isn't in the active status and repeat the determining action in the step 308. When the keyboard controller 72 detects the PCIRST signal transmitted from the south bridge chipset 56 shifts from the low level to the high level, then the keyboard controller 72 will determine whether the rebooting flag is "ON". If not, it is because the keyboard controller 72 determines the system status of the computer system 50 is in the standby status, the sleeping status, or the shutting-down status so as to set the rebooting flag as "OFF" in the step 310. At this time, go back to the step 302 and re-execute the above procedures. If the rebooting flag is "ON", it represents the computer system 50 keeps in the active status so as to determine the system status of the computer system 50 is in the rebooting status during the period of the PCIRST signal shifting, and the computer system 50 executes the rebooting action correspondingly. For example, programs can be reset to the initial conditions, or the variables of the programs are cleared to zero, setting the brightness and the control method of the display device 66 to the initial status, controlling the peripheral hardware components 74 in a disable status, afterwards choosing the operating system 74 (Windows, DOS, Linux etc.) stored in the hard disk 68 preferred by the user himself, and initializing the variables of the programs again. The above procedures can be executed repeatedly, that means after the computer system 50 executes the rebooting action, continue the procedures of determining the rebooting action for the next time.

In conclusion, the present invention utilizes the keyboard controller 72 to detect the S3, S4, S5 signals and the PCIRST signal transmitted from the south bridge chipset 56, cooperating with the rebooting flag for the keyboard controller 72 to determine whether the computer system 50 should execute the rebooting action. Thus, not only the application level of the keyboard controller 72 can be upgraded, but also the access frequency of the keyboard controller 72 from the basic input/output system 60 because of determining the rebooting function is decreased so as to raise the efficiency of the system and shorten the rebooting time.

Compared with the prior art, the method of the present invention and the related computer system can determine whether the computer system should execute the rebooting action through the keyboard controller. Thus, not only the application level of the keyboard controller can be upgraded, but also the access frequency of the keyboard controller from the basic input/output system because of determining the rebooting function is decreased so as to raise the efficiency of the system and shorten the rebooting time.

Those skilled in the art will readily observe that numerous modifications and alterations of the device and method may be made while retaining the teachings of the invention.

What is claimed is:

1. A method for determining a rebooting action of a computer system comprising:
   a keyboard controller of the computer system detecting whether a signal representing a system stage transformation is transmitted from a south bridge chipset;
   the keyboard controller determining whether a system status flag is set as "ON" when the signal representing the system stage transformation is received by the keyboard controller;
   setting a rebooting flag as "ON" and setting the system status flag as "OFF" when the keyboard controller determines the system status flag is "ON";
   the keyboard controller detecting whether a system sleeping flag representing the computer system isn't activated is "ON";
   the keyboard controller determining if the rebooting flag is set as "OFF" according to a determined result of whether the system sleeping flag representing the computer system isn't activated is "ON";
   the keyboard controller detecting whether the signal representing the system stage transformation is transmitted from the south bridge chipset;

the keyboard controller determining whether the rebooting flag is set as "OFF" when the signal representing the system stage transformation is received by the keyboard controller; and determining whether the computer system executes the rebooting action according to a determined result of the keyboard controller determining whether the rebooting flag is "ON".

2. The method of claim 1 further comprising the BIOS setting the system status flag of the keyboard controller as "ON" when the signal representing the system stage transformation is received by the keyboard controller.

3. The method of claim 1 wherein the keyboard controller detects if the signal representing the system stage transformation is transmitted from the south bridge chipset after the keyboard controller determines that the value of the system status flag is not "ON".

4. The method of claim 1 wherein the keyboard controller determining whether the system status of the computer system isn't activated comprises the keyboard controller detecting the system sleeping flag representing the computer system isn't activated is "ON".

5. The method of claim 4 wherein the system sleeping flag representing the computer system isn't activated being "ON" comprises the keyboard controller determining whether the system status of the computer system is in a standby status (S3), a sleeping status (S4), or a shutting-down status (S5).

6. The method of claim 5 wherein the keyboard controller determining whether the system status of the computer system is in the standby status S3), the sleeping status (S4), or the shutting-down status (S5) comprises the keyboard controller detecting an S3 signal (SLP_S3#), an S4 signal (SLP_S4#), or an S5 signal (SLP_5#) transmitted from the south bridge chipset of the computer system to determine whether the system status of the computer system is in the standby status, the sleeping status, or the shutting-down status.

7. The method of claim 6 wherein the keyboard controller detecting the S3 signal, the S4 signal, or the S5 signal transmitted from the south bridge chipset of the computer system to determine whether the system status of the computer system is in the standby status, the sleeping status, or the shutting-down status comprises the keyboard controller detecting the S3 signal, the S4 signal, or the S5 signal transmitted from the south bridge chipset of the computer system to determine whether the system status of the computer system is in the standby status, the sleeping status, or the shutting-down status in a polling manner.

8. The method of claim 1 wherein determining if the rebooting flag is set as "OFF" according to the determined result of whether the system status of the computer system isn't activated comprises setting the rebooting flag as "OFF" and determining the computer system not to execute the rebooting action when the keyboard controller determines the system status of the computer system is in the standby status, the sleeping status, or the shutting-down status.

9. The method of claim 1 further comprising executing the action of determining whether the system status of the computer system isn't activated after setting the rebooting flag as "ON" and setting the system status flag as "OFF".

10. The method of claim 9 further comprising setting the rebooting flag as "OFF" when determining the system status of the computer system isn't activated.

11. The method of claim 10 further comprising the keyboard controller determining if the signal representing the system stage transformation is received by the keyboard controller after the rebooting flag is set as "OFF".

12. The method of claim 9 further comprising not setting the rebooting flag as "OFF" and the keyboard controller determining whether the signal representing the system stage transformation is received by the keyboard controller when determining the system status of the computer system is activated.

13. The method of claim 9 further comprising the keyboard controller determining whether the system status of the computer system isn't activated after the keyboard controller determines the signal representing the system stage transformation isn't received by the keyboard controller.

14. The method of claim 1 further comprising setting the rebooting flag as "OFF" when the keyboard controller determines the rebooting flag is "ON".

15. The method of claim 1 further comprising the keyboard controller detecting whether the signal representing the system stage transformation is transmitted from the south bridge chipset after the keyboard controller determines the rebooting flag isn't "ON".

16. The method of claim 1 further comprising determining the computer system executes the rebooting action when the keyboard controller determines the rebooting flag is "ON".

17. The method of claim 1 wherein the keyboard controller of the computer system detecting whether the signal representing the system stage transformation is transmitted from a south bridge chipset comprises the keyboard controller detecting whether the signal representing the system stage transformation is transmitted from the south bridge chipset in a polling manner.

18. The method of claim 1 wherein the keyboard controller of the computer system detecting whether the signal representing the system stage transformation is transmitted from the south bridge chipset comprises the keyboard controller detecting whether the signal representing the system stage transformation is transmitted from the south bridge chipset in an interrupting manner.

19. A computer system for performing the method of claim 1.

* * * * *